United States Patent [19]

Test et al.

[11] Patent Number: 4,771,273
[45] Date of Patent: Sep. 13, 1988

[54] ANTI-TAMPER BRACKET

[75] Inventors: Dan Test, Winchester; Richard C. Dahlquist, Jr., Norwell, both of Mass.

[73] Assignee: C&K Components, Inc., Newton, Mass.

[21] Appl. No.: 789,188

[22] Filed: Oct. 18, 1985

[51] Int. Cl.⁴ ............................................. G08B 23/00
[52] U.S. Cl. .................................. 340/693; 340/571; 248/324
[58] Field of Search ............ 248/278, 282, 284, 288.1, 248/324, 183; 340/693, 572, 568, 571

[56] References Cited

U.S. PATENT DOCUMENTS 4,034,946 7/1977 Zimmer, Jr. ......................... 248/278
4,692,641 5/1978 Bellinghausen et al. ........ 340/628 X Primary Examiner—Joseph A. Orsino
Assistant Examiner—Jeffery A. Hofsass

[57] ABSTRACT

An anti-tamper bracket for use with a surveillance device, the bracket includes a bracket portion, a bracket cover, a trunnion, an adapter plug, a fastening means and a retaining plate, the bracket portion having a first through aperture formed therein, the first aperture having a shoulder, the shoulder having an upper surface and a lower surface, the trunnion having a pair of trunnion elements extending therefrom and having means of engaging the fastening means, the adapter plug including a first side, a second side, a pair of spaced through slots and a second through aperture positioned between the through slots, and the trunnion elements passed through the slots of the adapter plug, the second side of the adapter plug bearing against the upper surface of the shoulder of the first aperture, the retaining plate having prime side, a pair of through first slots and a center slot, the prime side having frictional means associated therewith, the trunnion elements passed through the first slots, the fastening means passed through the center slot and engaged with a fastening device, whereby tightening of the fastening device on the fastening means holds the trunnion in engagement with the adapter plug and the retaining plate, the adapter plug in engagement with the shoulder of the first aperture, and the prime side of the retaining plate in bearing relation to the lower surface of the shoulder of the first aperture and the trunnion having means of engaging a surveillance device.

9 Claims, 3 Drawing Sheets

ANTI-TAMPER BRACKET

BACKGROUND OF THE INVENTION

This invention relates generally to brackets for positioning detection equipment on walls and the like and more specifically to a bracket having antitampering features.

SUMMARY OF THE INVENTION

The invention disclosed herein comprises an anti-tampering bracket for use with a surveillance device, the bracket having a bracket portion, a support for the surveillance device, an adapter plug, a retaining plate and fastening means, the fastening means having engagement means, the bracket portion having a first through aperture formed therein, the first aperture having a shoulder, the shoulder having an upper surface and a lower surface, the support having means for engaging the adapter plug, the retaining plate and the fastening means, the adapter plug including a first side and a second side, the second side of the adapter plug bearing against upper surface of the shoulder of the first aperture, the retaining plate having prime side, the prime side having frictional means associated therewith, the fastening means engaged with fastening device, whereby tightening of the fastening device on the fastening means holds the support in engagement with the adapter plug and the retaining plate, the adapter plug in engagement with the shoulder of the first aperture, and the prime side of the retaining plate in bearing relation to the lower surface of the shoulder of the first aperture.

Alarm activating means may be associated with the anti-tamper bracket which provides an alarm condition when the anti-tamper bracket is secretly removed from the wall or an effort is secretly made to remove the bracket cover.

BRIEF DESCRIPTION OF THE DRAWINGS

Further details are explained below with the help of the example(s) illustrated in the attached drawings in which.

DESCRIPTION OF THE PREFERRED EMBODIMENT(S)

Figure 1:
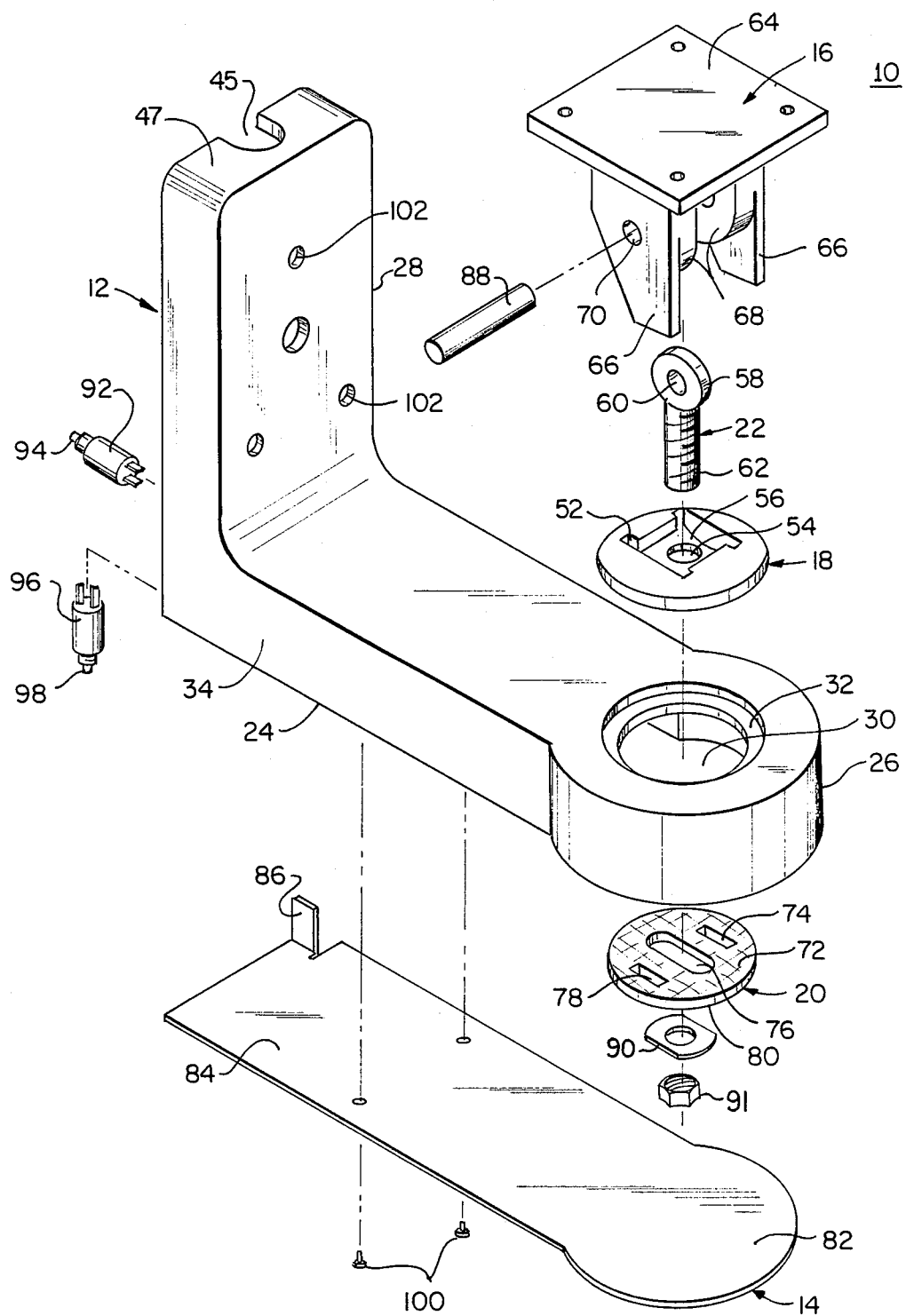
FIG. 1 is an exploded view of the anti-tamper bracket according to the present invention.
Figure 9:
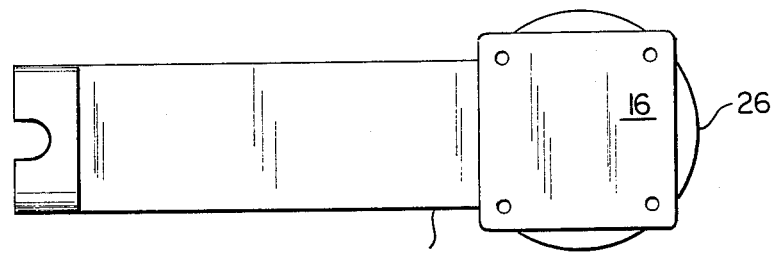
FIG. 9 is a top plan view of the anti-tamper bracket according to the present invention.
Figure 3:
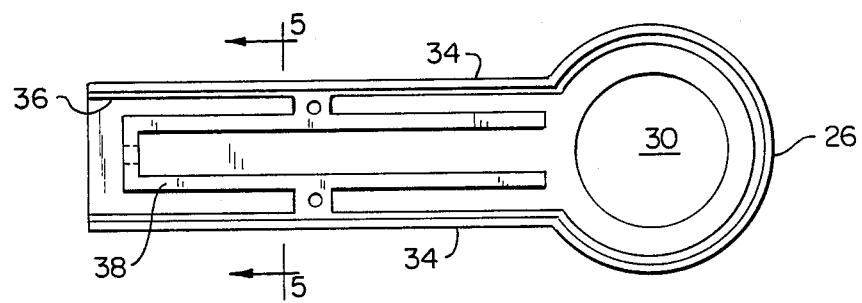
FIG. 3 is a bottom plan view of the arm of the bracket portion according to the present invention.
Figure 5:
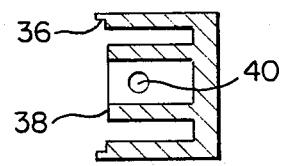
FIG. 5 is a sectional view, taken on line 5—5 of FIG. 3.
Figure 2:
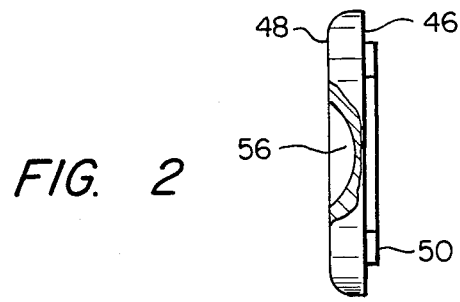
FIG. 2 is an side elevational view, partly in section of the adapter plug according to the present invention.
Figure 4:
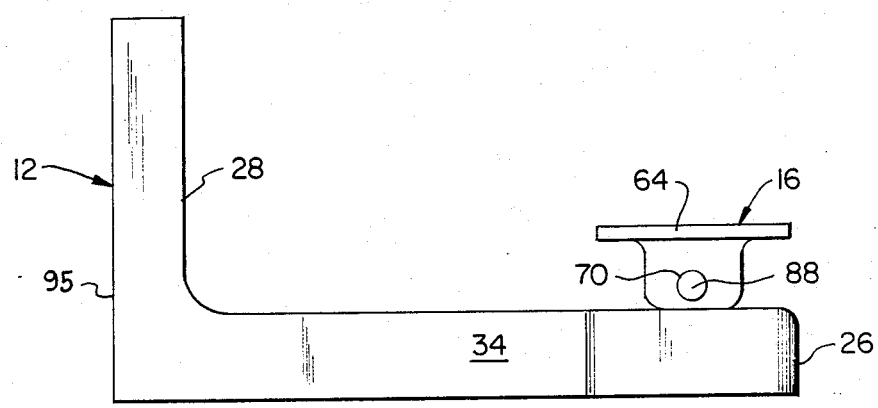
FIG. 4 is a side elevational view, of the anti-tamper bracket according to the present invention.
Figures 6, 7:
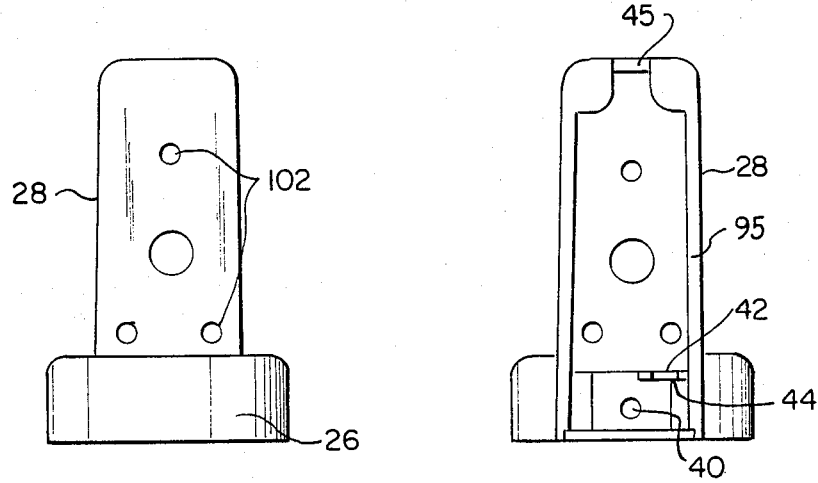
FIG. 6 is a front elevational view of the bracket portion according to the present invention.
FIG. 7 is a rear elevational view of the bracket portion according to the present invention.

There is shown in the drawings an anti-tamper bracket 10 comprising a bracket portion 12, a bracket cover 14, a trunnion 16, an adapter plug 18, a retaining plate 20 and an eyebolt 22.

The bracket portion 12 includes a rectangular arm 24 having a drum like circular portion 26 integral with one terminal end and an attachment portion 28 in integral, right angle relationship with the other terminal end. A through, centrally positioned opening 30 is formed in the circular portion 26 and a shoulder 32 is provided on the outer surface of the circular portion 26 circumscribing the opening 30. The arm 24 includes side walls 34 which continue as a wall included in the circular portion 26. The side walls 34 and the continuation wall of the circular portion 26 are stepped at their outer edge to provide a shelf 36. A frame like support portion 38 extends longitudinally between the side walls 34. The edges of the support portion 38 lie on the same horizontal plane as the shelf 36. A through hole 40 is formed in one end wall of the support portion 38. The attachment portion 28 includes extensions of the side walls 34 and a flange 42. The flange 42 is positioned between the side walls of the attachment portion 28 in abutting relation with the support portion 38 and includes a first U shaped opening 44. The attachment portion 28, also includes a second U shaped opening 45 formed in the end wall 47 as shown in FIG. 1.

The adapter plug 18 is generally disk-like in configuration having a first side 46 and a second side 48. A generally rectangular rib portion 50 extends from the first side 46 having a rectangular, through slot 52 formed adjacent to and along each side edge thereof and having a circular, through aperture 54 formed therein. The axis of the aperture 54 is coaxial with the central axis of the adapter plug 18. The part of the second side 48 opposite to the rib portion 50 is dished to provide an arced depression 56.

The eyebolt 22 comprises a circular head 58 having an eye 60 formed therethrough and having a threaded cylindrical shank 62 extending from the periphery thereof.

The trunnion 16 includes a square base portion 64 having a pair of trunnion elements 66 extending in right angle relation to the base portion 64. The trunnion elements 66 are in parallel relation to each other and each of them includes a support section 68 integral with the inner surface of the trunnion element 66 and terminating in an arced surface. The support section 68 is shorter in length than the trunnion element 66. A first opening 70 is formed through each of the trunnion elements 66 including its support section 68. The first openings 70 are coaxially aligned with each other.

The disk-like retaining plate 20 comprises a prime side 72, a through first slot 74, a centrally positioned, through center slot 76, a through second slot 78 and a secondary side 80. The first slot 74, center slot 76, and the second slot 78 are formed through the prime side 72 and the secondary side 80. The center slot 76 is positioned, in spaced parallel relation between the first slot 74 and the second slot 78 and the prime side 72 is in parallel relation with the secondary side 80. The prime side 72 is roughened to increase its coefficient of friction.

The bracket cover 14 is generally flat including a substantially semicircular first portion 82 having a rectangular support section 84 extending from the periphery of the first portion 82 on the same horizontal plane thereof. A tab 86 is bent up from the side edge and terminal end of the support section 84. The tab 86 is in right angle relation to the horizontal plane of the first portion 82.

Figure 8:
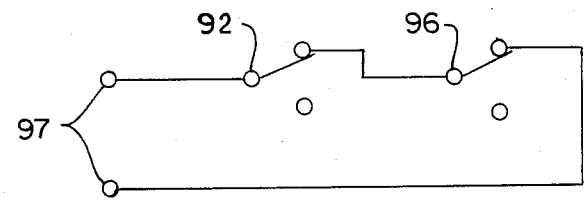
FIG. 8 is a schematic, showing one method of wiring the two actuating switches.

Assembly of the anti-tamper bracket 10 is normally accomplished by attaching trunnion 16 to a surveillance device, for example a camera or an intrusion detector, which mounts on the square base portion 64. The head 58 of the eyebolt 22 is located between the support sections 68 of the trunnion elements 66 with the axis of its eye 60 coaxially aligned with the first openings 70 of the trunnion elements 66. A pin 88 is press fitted in the first openings 70 and is passed through the eye 60. The eyebolt 22 can rotate about the pin 88. A normally open miniature first switch 92 is positioned in the hole 40 of the support portion 38 of the bracket portion 12, with its actuator 94 extending beyond the plane of the rear surface 95 of the attachment portion 28 and a normally open miniature second switch 96 is positioned in the U-shaped opening 44 of the flange 42 with its actuator 98 extending beyond the plane of the shelf 36. The anti-tamper bracket 10 is mounted against the wall of a building, for example, by passing screws or bolts through the openings 102 into the wall or into the threaded inserts in the wall. This attachment will press the actuator 94 of the first switch 92 against the wall, closing it. Power and signal connections are made to switches 92 and 96, typically wired as illustrated in the schematic shown in FIG. 8. As shown in FIG. 8 the switches 92, 96 are wired in series with a standard alarm panel 97 which in turn may be hard wired to a standard source of electricity. The power and signal cables are normally routed to the bracket portion 12 from the inside wall, through the wall surface on which the attachment portion 28 of the bracket portion 12 is mounted or they may be surface cables entering from beneath the bracket portion 12 through the opening in the bracket cover 14 adjacent the tab 86 when the bracket cover 14 assembled on the bracket portion 12 or they may be surface cables entering from above the bracket portion 12 through the second U-shaped opening 45. The first side 46 of the adapter plug 18 is positioned on the shoulder 32 of the bracket portion 12 with the aperture 54 in coaxial relation with the opening 30 and the rib portion 50 extending through the opening 30. The subassembly of the surveillance device, the trunnion 16, the engaged pin 88 and the eyebolt 22 is fitted to the subassembly of the bracket portion 12 and the adapter plug 18 by passing the shank 62 of the eyebolt 22 through the aperture 54 of the adapter plug 18 and the opening 30 of the bracket portion 12 and simultaneously passing the trunnion elements 66 through the slots 52 of the adapter plug 18 and the opening 30 of the bracket portion 12. The subassembly of the surveillance device, the trunnion 16, the engaged pin 88 and the eyebolt 22 and the subassembly of the bracket portion 12 and the adapter plug 18 is engaged to the retaining plate 20 by passing the shank 62 of the eyebolt 22 through the center slot 76 and simultaneously passing the trunnion elements 66 through the first slot 74 and the second slot 78 with the prime side 72 bearing against inner surface of the bracket portion 12 adjacent the opening 30.

The shank 62 of the eyebolt 22 is passed through the aperture of a washer 90 and then has a nut 91 threaded thereon urging the prime side 72 of the retaining plate 20 firmly against the inner surface of the bracket portion 12. The nut 91 is tightened by hand with a light torque, permitting the installer to tilt and swivel the surveillance device during the aiming process. After the surveillance device is properly aimed, the nut 91 is tightened to the maximum torque obtainable with a standard combination wrench, typically 15 ft-lbs.

The bracket cover 14 is now positioned on the shelf 36 with the tabs 86 extending into the cavity formed by the attachment portion 28. The under surface of the support section 84 of the bracket cover 14 bears against the actuator 98 of the second switch 96 closing it. The bracket cover 14 is fixed in place by a pair of screws 100 as indicated in FIG. 1.

If an intruder, for example, should attempt to remove the bracket cover 14 or move the attachment portion 28 from its position on the wall, one of the switch actuators 94, 98 would be released opening a circuit and triggering an alarm (not shown) to which the first and second switches 92, 96 are electrically engaged.

What we claim is:

1. An anti-tamper bracket for use with a surveillance device, the bracket includes a bracket portion, a bracket cover, a trunnion, an adapter plug, a retaining plate and an eyebolt, the eyebolt having a shank portion, the bracket portion having a first through aperture formed therein, the first aperture having a shoulder, the shoulder having an upper surface and a lower surface, the trunnion having a pair of trunnion elements extending therefrom and having means of engaging the eyebolt, the adapter plug including a first side, a second side, a pair of spaced through slots and a second through aperture positioned between the through slots, the shank of the eyebolt passed through the second aperture, and the trunnion elements passed through the slots of the adapter plug, the second side of the adapter plug bearing against upper surface of the shoulder of the first aperture, the retaining plate having prime side, a pair of through first slots and a center slot, the prime side having frictional means associated therewith, the trunnion elements passed through the first slots, the shank of the eyebolt passed through the center slot and engaged with a fastening device, whereby tightening of the fastening device on the shank of the eyebolt holds the trunnion in engagement with the adapter plug and the retaining plate, the adapter plug in engagement with the shoulder of the first aperture, and the prime side of the retaining plates in bearing relation to lower surface of the shoulder of the first aperture and the trunnion having means of engaging a surveillance device.

2. The combination as set forth in claim 1 further comprising a first switch and a second switch, the first switch having a first actuator, the first switch connected to an alarm system and to the bracket and the first actuator bearing against a wall on which the bracket is mounted, the second switch having a second actuator, the second switch connected to the alarm system and to the bracket and the second actuator bearing against the bracket cover whereby an unauthorized effort to remove the bracket from the wall or an unauthorized effort to remove the bracket cover from the bracket without deactivating the alarm system will activate it.

3. An anti-tamper bracket for use with a surveillance device, the bracket having a bracket portion, a support for a surveillance device, an adapter plug, a retaining plate and a fastening means, the fastening means having an engagement means, the bracket portion having a first through aperture formed therein, the first aperture having a shoulder, the shoulder having an upper surface and a lower surface, the support having means for engaging the adapter plug, the retaining plate and the fastening means, the adapter plug including a first side and a second side, second side of the adapter plug bearing against upper surface of the shoulder of the first aperture, the retaining plate having a prime side, the prime side having frictional means associated therewith, the fastening means engaged with a fastening device the support comprising a trunnion having a pair of trunnion elements extending therefrom, the trunnion elements engaging the adapter plug on one side of the bracket portion and the retaining plate on the other side of the bracket portion whereby tightening of the fastening device on the fastening means holds the support in engagement with the adapter plug and the retaining plate, the adapter plug in engagement with the shoulder of the first aperture, and the prime side of the retaining plate in bearing relation to the lower surface of the shoulder of the first aperture.

4. The combination as set forth in claim 3 wherein the fastening means comprises an eyebolt and the engagement means comprises a shank portion.

5. The combination as set forth in claim 4 wherein the eyebolt portion includes and eye and the eyebolt is engaged to the support by a pin passed through the eye.

6. The combination as set forth in claim 3 further comprising a switch and a bracket cover, the switch having an actuator and being connected to an alarm system and to the bracket, the actuator bearing against the bracket cover whereby when the bracket is engaged to a wall and an unauthorized effort is made to remove the bracket cover without deactivating the alarm system the switch will activate the alarm system.

7. An anti-tamper bracket for use with a surveillance device, the bracket having a bracket portion, a support for a surveillance device, an adapter plug, a retaining plate and a fastening means, the fastening means having an engagement means, the fastening means comprising an eyebolt and the engagement means comprising a shank portion, the bracket portion having a first through aperture formed therein, the first aperture having a shoulder, the shoulder having an upper surface and a lower surface, the support having means for engaging the adapter plug, the retaining plate and the fastening means, the adapter plug including a first side and a second side, second side of the adapter plug bearing against upper surface of the shoulder of the first aperture, the retaining plate having a prime side, the prime side having frictional means associated therewith, the fastening means engaged with a fastening device the support comprising a trunnion having a pair of trunnion elements extending therefrom, the trunnion elements engaging the adapter plug on one side of the bracket portion and the retaining plate on the other side of the bracket portion, the adapter plug including a first side, a second side, a pair of spaced through slots and a second through aperture positioned between the through slots, the shank of the eyebolt passed through the second aperture, and the trunnion elements passed the slots of the adapter plug, the second side of the adapter plug bearing against the upper surface of the first shoulder of the first aperture, the eyebolt including an eye and the eyebolt engaged to the support by a pin passed through the eye whereby tightening of the fastening device on the fastening means holds the support in engagement with the adapter plug and the retaining plate, the adapter plug in engagement with the shoulder of the first aperture, and the prime side of the retaining plate in bearing relation to the lower surface of the shoulder of the first aperture.

8. The combination as set forth in claim 7 wherein the retaining plate has a prime side, a pair of through first slots and a center slot, the prime side having frictional means associated therewith, the trunnion elements passed through the first slots, the shank of the eyebolt passed through the center slot and engaged with a fastening device.

9. The combination as set forth in claim 7 further comprising a bracket cover, a first switch and a second switch, the first switch having a first actuator, the first switch connected to an alarm system and to the bracket and the first actuator bearing against a wall on which the bracket is mounted, the second switch having a second actuator, the second switch connected to the alarm system and to the bracket and the second actuator bearing against the bracket cover whereby an unauthorized effort to remove the bracket from the wall or an unauthorized effort to remove the bracket cover from the bracket without deactivating the alarm system will activate it.

* * * * *